United States Patent [19]
Bobard

[11] 3,750,773
[45] Aug. 7, 1973

[54] STRADDLE TRACTOR INCLUDING AN IMPROVED TRACTOR FRAME

[75] Inventor: Emile Bobard, Beaune, Cote D'Or, France

[73] Assignee: Nathan Gilbert, Sherman Oaks, Calif.

[22] Filed: Mar. 4, 1970

[21] Appl. No.: 16,523

Related U.S. Application Data

[63] Continuation-in-part of Ser. No. 709,756, March 1, 1968, abandoned, which is a continuation-in-part of Ser. No. 549,711, May 12, 1966, abandoned.

[52] U.S. Cl. ............... 180/1 F, 280/34 R, 180/77 R
[51] Int. Cl. ............................................. B62d 49/00
[58] Field of Search ....................... 180/1 F, 72, 77; 280/34

[56] References Cited
UNITED STATES PATENTS

| | | | |
|---|---|---|---|
| 2,647,795 | 8/1953 | Kucera | 180/1 F UX |
| 3,306,390 | 2/1967 | Jamme | 180/1 F X |

FOREIGN PATENTS OR APPLICATIONS

| | | | |
|---|---|---|---|
| 1,100,352 | 4/1955 | France | 180/1 F |
| 1,363,401 | 5/1964 | France | 180/1 F |

*Primary Examiner*—Kenneth H. Betts
*Attorney*—Wilkinson, Mawhinney & Theibault

[57] ABSTRACT

Improvements in tractors of the straddle type, comprising a relatively simple deformable frame of low cost, and means for adjusting the straddle height according to the use of the tractor. The frame sides are of inverted V-shape, providing a free space at their lower portions permitting convenient coupling to implements with large transverse dimensions. The frame is formed by a rigid hoop of inverted U-structure which may be inclined, the tractor power unit being mounted on the transverse portion of the hoop. The power of the driving unit is transmitted to driving wheels respectively mounted on the extremities of the arms of said hoop.

14 Claims, 12 Drawing Figures

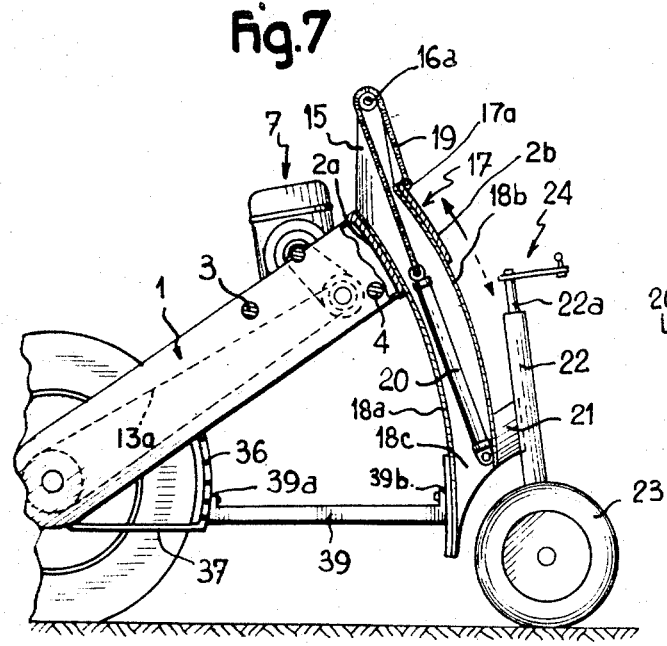
Fig. 7
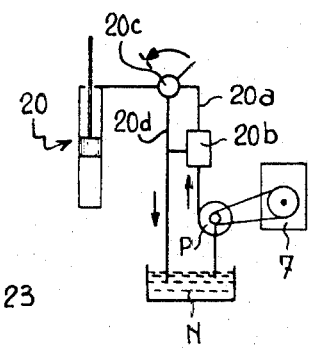
Fig. 8
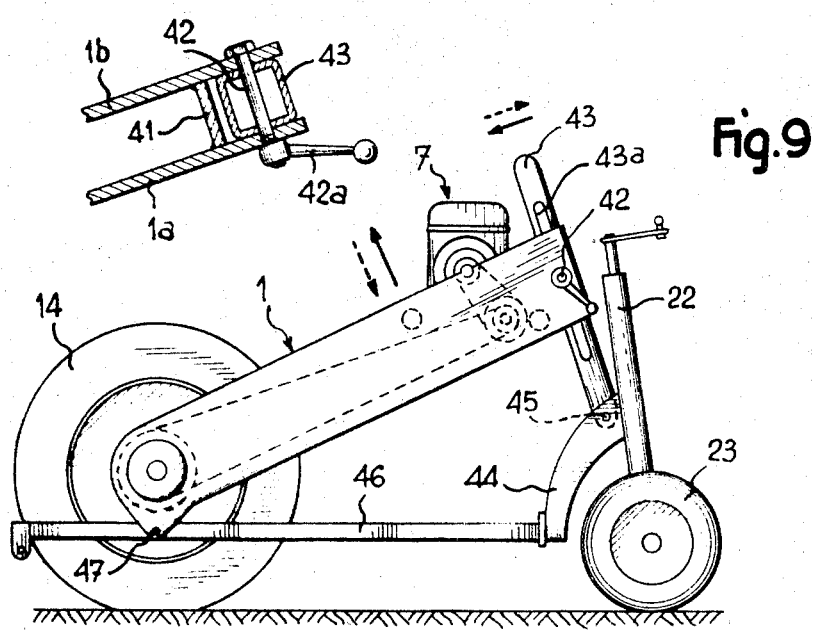
Fig. 10
Fig. 9

STRADDLE TRACTOR INCLUDING AN IMPROVED TRACTOR FRAME

This application is a continuation-in-part of application Ser. No. 709,756 filed on Mar. 1, 1968, now abandoned, which in turn was a continuation-in-part of application Ser. No. 549,711 filed May 12, 1966, now abandoned.

The invention relates to a tractor of the straddle type, comprising a deformable frame, the straddle of which can be adapted to the various uses of the tractor.

A straddle vehicle is already known (see German Pat. No. 1,069,416 to WEHSELY) which comprises a deformable frame so that its straddle height can be adjusted to the various uses of the tractor longitudinal couplings of harvester-thresher machines for example, or to transverse couplings of machines permitting operations to be carried out on several types of cultivation, such as hoeing machines or sowing machines.

The frame of this type of tractor comprises a cross-member extending above ground on four inclined legs pivoted together in pairs and in the form of two deformable sides on each extremity of the cross-member. This cross-member carries driving means associated with wheels mounted at the bottom part of the legs by transmission means provided inside this cross-member and in the legs.

Furthermore, such legs consist of elements capable of sliding into each other in order to make their length correspond to the height of the cross-member and to the wheel base.

The wheel legs and their articulations, along with the transmission means to the wheels, are necessarily deformable so as to correspond to the variations in length of the legs and are thus complex in construction and expensive.

The present invention is directed to overcoming these drawbacks.

An object of the invention is to provide a straddle tractor frame which is relatively simple in construction and which comprises sides of inverted V-shape and forming at their lower portion a free space for convenient coupling, by a transverse motion, of machines or implements which have a large transverse dimension in their position of use.

A further object of the invention is to provide simple and strong means for the displacement of rigid elements equipped with a driving wheel, and means for driving this wheel with respect to the rigid elements.

A further object of the invention is to provide a rigid hoop in the form of an inverted U equipped with means for transmitting the power of an engine carried by the transverse portion of the hoop to driving wheels respectively mounted on the free extremities of the arms of said hoop. The rigid hoop may be inclined.

Other objects and advantages of the invention will become apparent from the following description with reference to the accompanying drawings:

In these drawings:

FIG.7 shows in vertical section with parts broken away, a further essential element of the tractor of FIGS.1 and 2;

FIG.8 is a diagram of a hydraulic device comprising a jack fitted on the element of FIG.7;

FIG.9 is a view in elevation of an alternative form of the tractor shown in FIGS.1 and 2;

FIG.10 is a view in transverse section with parts broken away, of an essential element of the tractor of FIG.9;

Figure 1:
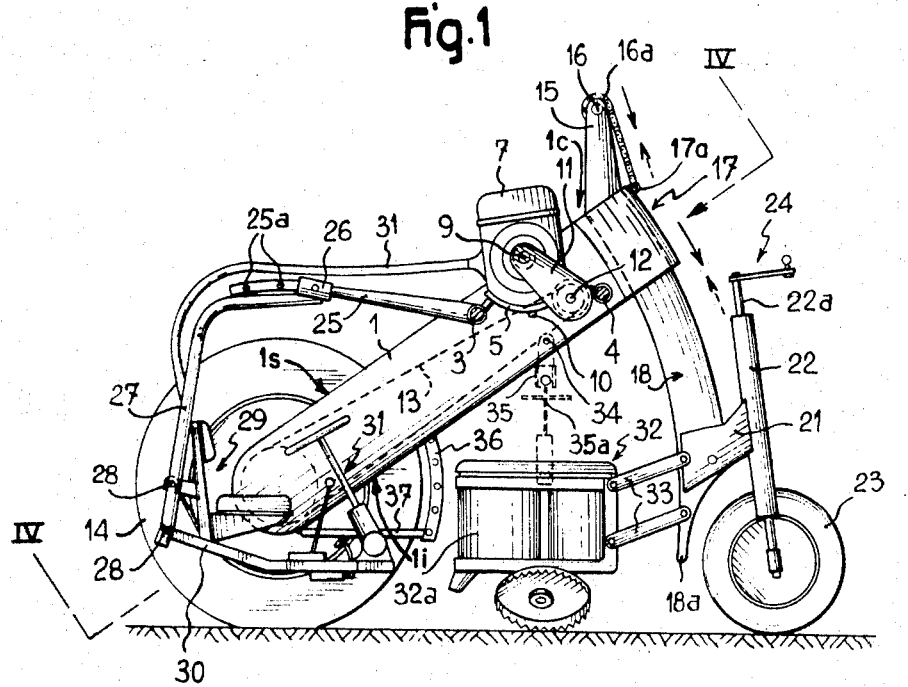
FIG.1 and 2 show respectively in side elevation and in plan, a tractor according to the invention, this tractor being equipped with the usual type of sowing machine.
Figure 2:
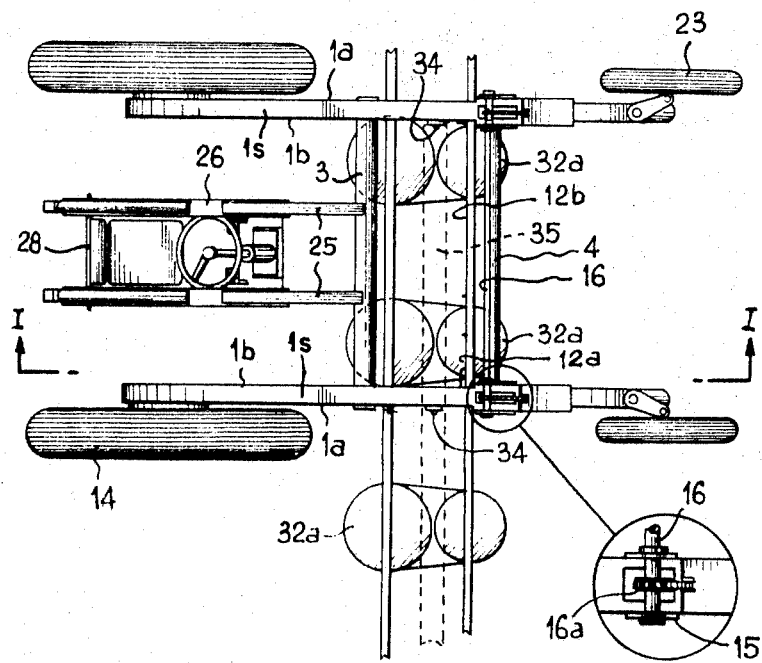

In FIGS.1 and 2 there is shown a tubular element 1, arranged in an inclined position, having a rectangular transverse section, resulting from the assembly by welding of the greater part of the longitudinal edges of two rigid side-plates 1a, 1b on the edges of two narrow bands 1s, 1i of thick steel sheet, suitably cut-out and having a length slightly less than that of the longitudinal edges of the side-plates so as to form at the upper portion of the element 1 a fork 1c which will again be referred to later.

The common profile of the lower parts of the two side-plates 1a, 1b, is that of a circular arc on which is fixed, in a removable manner, a curved band (without reference), and the extreme opposite portion corresponding to the above-mentioned fork, is closed by a band of thick steel, also curved and rigidly welded on the side-plates 1a, 1b, and on the ends of the above straight bands 1s, 1i, so as to form a casing.

In addition, the extremities of two rigid tubular rods 3 and 4, arranged transversely with respect to the side-plates 1a, 1b and passing through and welded on the side-plates 1a, 1b which constitute the end portion of the above-mentioned casing.

The other extremities of the rods 3 and 4 are assembled, also by welding, on another element 1 identically the same as the element described above; this element is arranged symmetrically with the first element 1 with respect to the central vertical plane of the rods 3 and 4 in order to form a rigid assembly having the shape of an inverted U in an inclined position.

Figure 3:
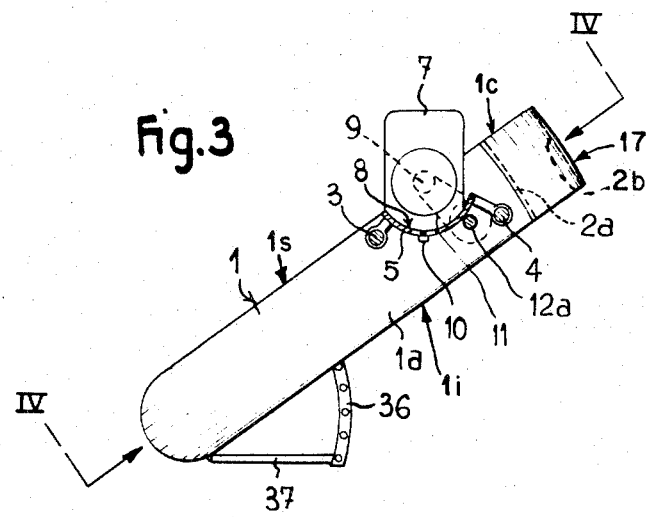
FIG.3 shows in elevation and partial cross-section, a group of elements of the frame of the tractor shown in FIGS.1 and 2.
Figure 6:
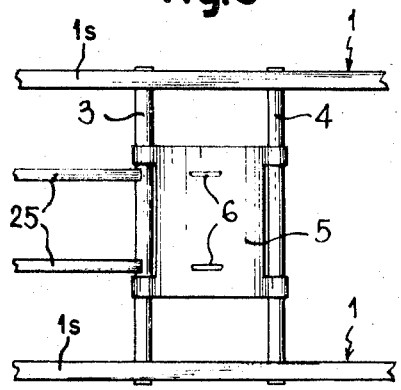
FIG.6 is a view in a plan and with parts broken away, of another element of the assembly of FIG.3.

A rigid curved plate 5 is suitably fixed on the central part of the cross rods 3 and 4 (FIGS.3 and 6).

Each plate 5 is provided with two elongated holes 6, extending parallel to the central vertical plane of this plate, on each side of the said plane, and it should be noted that the upper face of this plate 5 is suitably machined and has a cylindrical form with generator lines parallel to the rods 3 and 4.

A driving unit 7 (not shown in FIG.2 for clarity purposes), comprising an engine and a speed-changing device, is arranged in a casing comprising a bottom 8. This bottom 8 has a cylindrical form coaxial with the output shaft 9 of this driving unit so as to form a sole-plate mounted on the plate 5, thus forming a platform, and it will be noted that the radii of curvature of this platform and the sole-plate are equal.

In addition, two screws 10, having smooth necks which are adapted to slide with light friction in the holes 6 of the plate 5 and threaded ends engaged in tapped holes in the sole-plate 8, ensure the fixing of this driving unit 7 on the platform 5.

The end of the shaft 9 is associated, through a conventional transmission device 11 comprising chains and toothed wheels, with a conventional differential mechanism 12 (not shown in FIG.2 for clarity purposes) for driving two half-shafts 12a, 12b arranged transversely with respect to the elements 1, at a level approximately equal to that of the cross rods 3 and 4. The free extremity of each of these two right and left half-shafts 12a, 12b is engaged in the casing formed by the corresponding element 1, and is equipped with a toothed wheel (without reference) for driving a chain 13 which is engaged on another toothed wheel fixed on a shaft of the driving wheel 14, this shaft being mounted transversely, in a conventional manner, on the lower portion of the element 1.

It will be understood that the structure described above has the general shape of an inverted, inclined U, and that it may constitute the driving portion of a straddle tractor.

Figure 4:
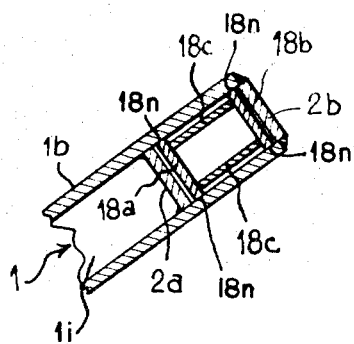
FIG.4 is a view in transverse section with parts broken away, of the upper part of one of the essential elements of FIG.3.

Furthermore, as shown in FIG.4, the extremities of the top portions of the side-plates 1a, 1b of each element 1 are rigidly braced by a curved band 2b, of which the axis of curvature is coaxial with that of the band 2a, and is in the vicinity of the axis of the shaft of the driving wheel 14, but could be relatively distant from this latter. These end portions of the side-plates 1a, 1b and the bands 2a, 2b thus form a bent sleeve 17 having a rectangular radial section in which is engaged a tubular element 18.

This tubular element 18 is produced by the assembly by welding of two curved plates 18a, 18b on the concave and convex edges of two arcuate plates of geometrical ring shape 18c, identical with each other. The transverse axes of curvature of the curved plates 18a, 18b are practically coincident with that of the faces 2a, 2b of the sleeve 17, so as to permit this latter to slide on the element 18.

In this connection, it will be noted that the ring elements 18c are welded slightly recessed with respect to the edge of the plates 18a, 18b so as to form four ribs 18n which have been machined so as ensure sliding movement with light friction on the internal faces of the side-plates 1a, 1b.

Furthermore, two arms 15, identical to each other and extending upwards, are welded on the outer faces of each tubular element 18 so as to form a fork member; a transverse shaft 16 is suitably mounted at the upper extremity of arms 15 and is provided with toothed wheels 16a. The extremities of a chain 19 is fixed on a hook 17a rigid with the convex face of the sleeve 17; this chain is engaged over the roller 16a and is passed into the hollow core of the corresponding element 18, while its other extremity is fixed on the piston rod of a hydraulic jack 20. This jack 20 is also mounted inside the hollow core of this element 18 and the bottom of its cylinder is fixed in the usual manner on the lower portion of the element 18. Finally, the upper chamber of the jack 20 is connected to a conventional hydraulic device (not shown) to which reference will be made later.

Two rigid plates 21 are welded on the lower part of the sides of each element 18 and extend in front of the convex face of this element so as to form two wings on the substantially vertical edges of which is welded the lower portion of a tubular upright 22 which is fitted in a conventional manner with a steering shaft 22a. A steering wheel 23 is mounted on the bottom extremity of the shaft 22a and the upper extremity of this shaft is arranged, with respect to the ground, at a level slightly higher than that which can be reached by the cross-rods 3 and 4, as will be explained later.

The top extremities of the two shafts 22a are provided with a conventional control system for steering the wheels 23, indicated by the general reference 24 and intended to be actuated from a driving station, to which reference will be made below. Finally, as shown in FIG.7, the curved plate 18a of each element 18 extends downwards, practically to the level of the wheel hub 23 and behind this wheel, and the rings 18c are cut away obliquely in order to free the pivotal steering field of the corresponding wheel 23.

It should be stated that the width of the side-plates 1a, 1b is sufficiently large to ensure a firm fit of each element 18 in its sleeve 17. It will then be understood that the rectangular radial section of each sleeve 17 ensures, for each system comprising an element 18 and an upright 22 of the steering wheel 23, an invariable orientation with respect to the inverted and inclined U-structure described above, so that the two elements 18 form stays for the said structure, on which the sleeves 17 are fixed by the system formed by the jacks 20 and the chains 19.

The upper chamber of each jack 20 is in fact connected to a pipe 20a (FIG.8) which can be supplied by a fluid delivered under pressure by a pump P from a service tank N, this pump being coupled in the usual manner to a power take-off means provided on the driving unit 7. In addition, a conventional spring actuating safety valve 20b is connected in series with the pipe 20a in order to limit the pressure of fluid delivered to each jack 20 by the pump P to a pre-determined value, and a cock 20c of the three-way type is also connected in series on the pipe 20a in order to interrupt at will the supply to the jacks 20 or to discharge these latter into the service tank N through a pipe 20d, or again to isolate this jack 20 from the supply pipe from the pump P and from the discharge pipe 20d, when the engine 7 is stopped.

It will then be understood that this hydraulic device makes it possible to proportion the quantity of fluid contained in the upper chamber of each jack 20 so as to drive the two sleeves 17 simultaneously, by means of the rollers 16a fixed on the shaft 16, on their tubular element 18 and thus to regulate the straddle height of the platform carrying the driving unit 7.

The lengths of the arms 15 and of the chains 19 and the travel of the pistons of the jacks 20 are adapted to the length of the curvilinear movement of these sleeves 17 on the stanchions 18.

In addition (FIGS.1 and 2) two rigid rods 25, identical with each other, arranged parallel to each other and perpendicular to the cross-rod 3, are fixed overhanging, by welding one of their extremities on the rear face of this cross-rod 3. The end portion of each rod 25 is bent and is provided with holes 25a.

The bent portion of each rod 25 is fitted with a sleeve 26 arranged to slide over this bent portion and fixed in the usual manner to this latter by a pin engaged in a hole 25a. Two steel bar sections 27, identical with each other and elbowed practically at right angles, are respectively fixed at one of their extremities to each of the sleeves 26.

The arms thus suspended, of these two elements 27 are assembled to each other by rods 28 forming a ladder on their lower portion, this ladder being located between the rear portions of the driving wheels 14.

On these rods are engaged the hooks and forks rigidly fixed to the frame of a driving seat 29, and the hooks and forks fixed on a tubular element 30, on which is mounted a steering column 31, levers and pedals (with no reference numbers) so as to constitute a driving station. It should be observed that a driving station of this kind is described in detail in patent application Ser. No. 884,523 of Dec. 12, 1969, in the name of the present Applicant, now U.S. Pat. No. 3,696,880.

It should be noted that the driving devices (accelerator pedal, clutch pedal, brake pedal, gear lever) and the steering column mounted on this frame are associated in the usual manner with devices which are connected, by flexible cables, some of which may be of a hydraulic type, to corresponding devices which are suitably mounted on the elements of the driving unit 7, on the brake drums of the tractor wheels and on the steering device 24 (not shown). The cables, and where applicable the hydraulic pipes connected to this driving unit, are grouped together in the form of a flexible cable 31 shown in FIG.1.

In addition, as shown in FIGS.1 and 2, a sowing machine 32 constituted by conventional seeding devices 32a, identical with ach other and mounted in a transverse line on a frame, is coupled in the usual manner by rods 33 to the bottom portions of the stanchions 18.

For the sake of clearness of the drawings, the right-hand and left-hand parts of the sowing-machine 32 have been broken away in FIG.2. In this figure, there can only be seen three devices 32a and it should be observed that a sowing-machine of this kind generally comprises six seeding devices 32a and is in consequence, in the position of use, very wide with respect to the width of the tractor.

The foregoing description makes it possible to understand that the general shape of an inverted V of the sides of the tractor ensures an effective position of use of an implement, such as the sowing-machine 32, due to the position of the driving station 29, 30 arranged to the rear of the sowing-machine. The driver can in fact supervise simultaneously the driving of the tractor and the work of the implement which is coupled to this latter.

In addition, this arrangement forming a space free from any parts at the bottom portions of the elements 1 and 18 of the tractor frame is remarkably advantageous for the transverse mounting of devices intended to carry out operations simultaneously on several lines of cultivation, such as the sowing-machine 32.

For this kind of mounting, it is in fact only necessary to provide on the side-plate 1a of the right-hand side of the frame and on the side-plate 1b of the left-hand side of this frame, two eyebolts 34 on which can be engaged the holes of lugs rigidly fixed to a metal section 35, in order to fix this section transversely to the tractor frame. The overhung portion of the member 35 on one side of the tractor is slightly larger than one-half of the width of the sowing-machine 32, considered in its position of use.

This member 35 has a transverse section in the shape of an inverted U, the arms of which are bent towards the interior, facing each other, so as to form a travelling rail for a trolley provided with a suspension rod 35a at the extremity of which the frame of the sowing-machine 32 can be hooked.

It will thus be seen that this sowing-machine can be suspended from the overhung portion of the rail 35, for example on the right-hand side of the tractor, and can be pushed into its position of use between the side elements of the tractor to which it may be coupled. It is then only necessary to unhook the suspension rod 36 and to disengage the lugs on the rail 35 from the eyebolts 34 in order to be able to utilize this implement.

Operations in the reverse order to that referred to above obviously enable the sowing-machine 32 to be easily freed from the tractor.

It will thus be seen that the straddle height of the platform 5 can be regulated for the purpose of other methods of use of this tractor, by means of the device of FIG.8, by the effect of the weight of the inverted U-structure.

Adjustments of this kind can be facilitated, in certain cases, by chocking at the front of the visible driving wheels 14, by engaging the engine, to elevate the driving wheel elements 1, excluding the steering wheel system. These adjustments of the straddle height do not involve any action on the invariable members of the transmission, in particular the differential 12, the shafts 12a, 12b which are coupled to it and the chains 13 housed in the casings 1; similarly, these adjustments do not involve any action on the members of the steering device 24.

Although the transverse arrangement of the engine 7 adapts itself, without any interference with the operation, to appreciable angular variations of the engine, it is at most possible, after a sliding movement of the inverted U-structure on the stanchions 18, to re-establish a good working position of the engine 7 by manually tilting this latter on the platform 5, after having slackened-off the screws 10, these latter being obviously re-tightened when this adjustment has been effected.

With regard to the various forms of utilization of this tractor, a position of the sleeves 17 on the stanchions 18 corresponding to an average level of the platform 5 can be adapted for longitudinally-coupled machines, such as the harvester- referred to in the above-mentioned U.S. Pat. No. 1,069,416, and with a low position of this platform the tractor may be employed in a manner similar to that of tractors with conventional frames.

For such uses, and more particularly for carrying heavy loads or in order to avoid fatigue of the sleeves 17 on their stanchions 18, the lower part of the element 1 can be assembled to that of the element 18 of each side by a removable longitudinal girder.

Figure 5:
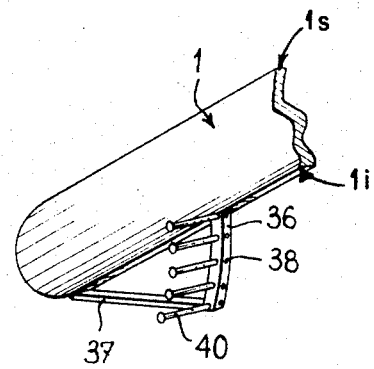
FIG.5 shows in perspective and with parts broken away, the lower portion of the element shown in FIG.4.

In fact, for each of the sides of the tractor frame (FIG.5), one of the extremities of a bent tubular member 36, the axis of curvature of which is approximately coaxial to that of the bands 18a, 18b, is welded under the lower face of the element 1. The radius of curvature of this member 36 is sufficiently great for its end side to be located in front of the driving wheel.

A flat bar 37 is welded at its extremities, on the one hand on the bottom portion of the said face of the element 1 and on the other hand on the lower extremity of the member 36, in order to form a rigid circular segment.

The convex face of this member 36 is provided with tapped holes 38 for the engagement of screws providing the fixing of a lug 39a secured to one of the extremities of a usual longitudinal girder 39. The other extremity of this girder is fixed to a lug 39b adapted for fixing by nuts and bolts on the lower portion of the curved plate 18a of the corresponding stanchion 18.

For such methods of use, the position of the driving station between the driving wheels of the tractor can obviously be modified by a sliding movement of the sleeve 26 which supports the assembly ladder 27 for the parts of the frame of this driving station, one of the holes 25a permitting this support 27 to be fixed on the arms 25.

For other uses of the tractor, the position of the driving station of this tractor may also be readily adapted to each of these methods of use. In fact, the two lateral faces of the circular segment 36 are provided with suitably machined holes for the overhung mounting of rods 40. The distance formed between these rods 40 being exactly the same as the distance between the rods 28, rigidly fixed to the support 27, it is thus possible to unhook the seat 29 and the frame 30 of the median or central driving stations and then, after releasing the sleeves 26, to disengage the supports 27 from the arms 25 and to hook the seat 29 and the frame 30 on the rods 40.

The rods 40 can easily be removed so as to be refixed on the other face of the segment 36 or on either face of the segment of the other element 1 so as to provide other positions of the driving station appropriate to the use of the tractor.

Finally, for driving a machine such as a harvester coupled to this tractor, there may be provided on the shaft 9 of the driving unit 7, a shaft end extending to the exterior of the casing of this unit and sufficiently long to receive a pulley (not shown in order to simplify the drawings), this pulley constituting a conventional power take-off means.

Furthermore, results identical with those concerned with the convenience of adaptation of the tractor frame to various methods of use would obviously be obtained, for the longitudinal or transverse couplings of implements, by the equipment on each side of the frame of such a tractor of sliding means which associate, irrespective of their relative inclination, an element equipped with a driving wheel with another element equipped with a steering wheel.

Thus, as shown in FIGS.9 and 10, on each side, the side-plates 1a, 1b can be braced by a flat plate 41. This plate 41 closes the top portion of the transmission casing of the driving wheel 14 and forms a forked member on the upper extremity of the element 1. The side plates of each fork are provided with two coaxial holes in which is engaged a bolt 42 fitted with a nut with a handle 42a.

In addition, a tubular element 43 having a thickness slightly smaller than the opening of the arms of this fork and two elongated slots 43a respectively open longitudinally on the central portion of both of its two sides, is mounted in this fork, the bolt 42 being engaged in the two slots 43a of the element 43.

The foot of this element 43 is arranged between the arms of a fork member formed by two gussets 44 rigidly fixed to the upright 22 of the shaft of the steering wheel 23. These two gussets and the sides of the element 43 are provided with holes for a pivotal shaft 45, so that the element 43 constitutes a stanchion for the corresponding element 1.

The gussets or brackets 44 extend to the rear of the pivotal steering field of the wheel 23 to a level substantially equal to that of the bottom portion of the element 1, and a bar 46 forming a longitudinal girder is rigidly fixed to the bottom portion of the brackets 44. This girder 46 extends underneath the element 1 and beyond its rear portion and the side-plates 1a, 1b are provided with two wings which extend downwards below the wall of the transmission casing so as to form another fork provided with a transverse shaft 47 permitting the articulation of the member 46.

It will be understood that the fork with the bolt 42 constitutes a slide for the stanchion 43 and that, by means of this slide and of such articulations 45 and 47, the elements 1, 43 and 46 of one side constitute a deformable triangle which enables the level of the platform carrying the driving unit 7 to be adjusted. Such adjustments may be effected with the aid of conventional lifting means (jacks or pulley-blocks), the nut 42a being slackened. However, each side could be equipped with hydraulic devices similar to that described above and similar to the arrangement shown in FIG.11.

It should be noted that the plate 41 is sufficiently spaced apart from the rod of the bolt 42 to permit a pivotal movement of the stanchion 43 on this rod, and it will be understood that the rigidity of each side is ensured by the tightening of the nut 42a on its bolt 42, the width of the side-plates 1a, 1b being adapted to this rigidity.

This rigidity could furthermore be reinforced by conventional means for locking the articulation 45 and/or the articulation 47.

Figure 11:
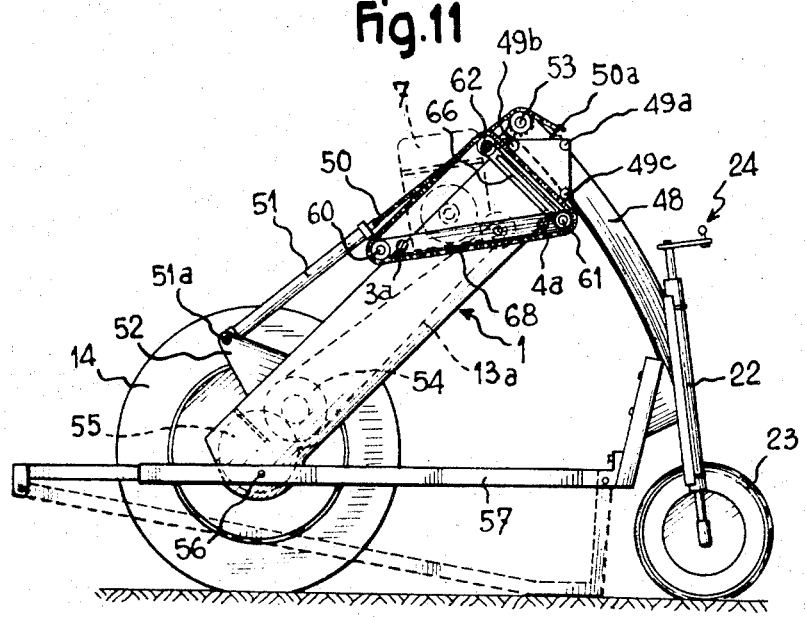
FIGS.11 and 12 show respectively a side elevation and a plan view of a further alternative form of the tractor according to the invention.

Finally, in FIG.11, a curved stanchion 48 of the same type as the stanchion 18 and rigidly fixed to an upright 22 of the shaft of a steering wheel 23 can ensure the guiding of a fork on the element 1, similar to the fork with the bolt 42 described above.

For an alternative form of this kind, the upper portions of the side-plates 1a, 1b are stayed by three transverse shafts for a roller 49a applied against the convex face of the stanchion 48 and for two rollers 49b, 49c applied against the concave face of this stanchion. The widths of the side-plates 1a, 1b and the dimension of the stanchion 48 in the radial direction are sufficiently large for the triangular arrangement of the three roller shafts to ensure a firm assembly, of the nesting type, of the element 1 on the stanchion 48.

One of the extremities of a cable 50 is fixed on a hook 50a secured to the extremity of the element 1, while the other extremity of this cable is coupled to the piston rod of a hydraulic jack 51, similar to the jack 20 referred to above, and connected to a hydraulic device identical with that of FIG.8. The bottom of the cylinder of this jack 51 is articulated at 51a on a rigid support 52 fast with the upper wall of the element 1.

Finally, the top extremity of each stanchion 48 is equipped with a thrust bearing for a shaft 53, on which are keyed two guiding rollers for the corresponding cables 50 so as to constitute an operating device for the inverted U-structure similar to that shown in FIG.7.

In addition, in this alternative form, the transmission means with which each element 1 is equipped comprise a chain 13a similar to the chain 13 mentioned above and engaged on a toothed wheel 54, the spindle of which is arranged transversely in the casing, above the shaft of the driving wheel 14.

A conventional speed-reduction gear with toothed pinions is arranged in a casing 55 fixed on the outer face of the lower portion of the side-plate 1a, this casing being partly housed in the cavity usually provided in the driving wheel 14.

This reduction gear comprises an input pinion which is keyed on the end of the shaft of the toothed wheel 54, and an output pinion which is keyed directly on the shaft of the driving wheel 14.

The face of the speed reduction casing adjacent the outer face of the driving wheel element 1, comprises an axle 56 in order to permit the mounting of a removable longitudinal member 57, similar to the member 46 described above and arranged within the space occupied by its side.

Figure 12:
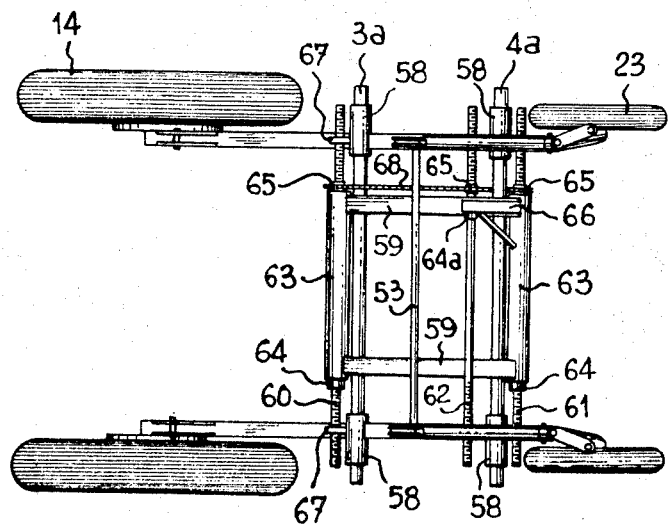

In FIG. 12 there are again seen the elements 1 of the two sides of the tractor. Two sockets 58 are respectively welded transversely on the upper and lower edges of the upper portion of the element 1 of one side, and the other side is provided in identically the same way with two other sockets 58 similar to those above. The bores of the four sockets are provided to slidably receive two rods 3a, 4a which have a cross-section corresponding to these bores, and the extremities of the rod 3a are respectively inserted into the sockets of the upper edges of the two elements 1, while those of the rod 4a are respectively passed into the sockets of the lower edges of these two elements.

In addition, two steel section elements 59, identical with each other, are welded perpendicularly on the central portions of the two rods 3a, 4a so as to form a raised platform, arranged between the two sides and on which is fixed the driving unit 7 (comprising the engine and transmission unit, and shown in outline only in FIG. 11).

Three other rods 60, 61 and 62, of circular section, smaller than that of the rods 3a, 4a and having a length similar to that of these latter, are spaced apart from ach other in the form of a parallel triangular configuration, extending transversely to the sides.

Two tubular elements 63 arranged parallel to the rods 3a, 4a are welded on the extremities of the two members 59, and the rods 60 aand 61 are passed into these elements 63. Each of these rods 60, 61 is fixed laterally to its element 63 by a stop-ring 64 and by the hub of a pinion 65 which are respectively mounted on each side of the elements 63.

A rigid arm 66 extending obliquely upwards is welded at one extremity perpendicular to the element 63 close to the rod 4a and practically straight above a section member 59.

The upper extremity of the arm 66 is provided with a bore into which the third rod 62 is passed, and the length of this arm 66 is sufficient for the rod 62 to be located slightly above the upper edge of each element 1. Finally, the rod 62 is fixed laterally to its arm 66 as are also the rods 60, 61, by a stop-ring 64a and the hub of a pinion 65.

In addition, the opposite extremities of each of these rods 60 to 62 comprise threaded portions of equal pitch but of opposite direction, which are engaged in appropriate nuts 67, the nuts 67 for these three rods being fixed on the upper and lower edges of the elements 1.

It should be stated that the three pinions 65 keyed on these rods 60 to 62 are strictly identical with each other and are arranged in the same longitudinal plane so as to permit the engagement of a suitable chain 68 on these pinions, for the purpose of driving them at equal speeds by a power take-off means (not shown) of the driving unit 7.

For this purpose, the chain 68 can also be engaged on a pinion mounted freely on a power take-off shaft of the driving unit 7 and associated with a dog-clutch device so as to be driven at will by the engine.

It will be understood that due to the effect of the rotation of these rods 60 to 62, by means of the corresponding nuts 67 the sides will be moved away from or brought closer to each other, but in order to facilitate this relative movement and to prevent any jamming caused by bending of the sides as a result of transverse friction of the wheels on the ground, the movement of the vehicle may advantageously be effected by acting on the driving wheels 14. One of the guiding rollers for cables 50 is slid on shaft 53 and this shaft in turn slides on one of its bearings during lateral adjustment.

The lengths of the shafts 12a, 12b will of course correspond to the greatest width of the frame, and the toothed wheels which associate them with the chain 13a comprise splined hubs permitting the sliding movement of the fluted ends of these shafts. In addition, the steering system 24 is provided with means to permit variations in length of its elements and in particular this system 24 will be constituted by devices of a hydraulic type, such as those described in the application Ser. No. 783,306 of Dec. 12, 1968, now abandoned in the name of the present Applicant.

It will furthermore be noted that these variations of the distance between the sides do not necessitate any modifications of the transmission devices mounted in the elements 1.

Finally, the structure formed by the transverse rods 3a, 4a and the members 59 on the one hand and the triangular configuration of the threaded rods 60 to 62 on the other, ensures firm bracing of the upper parts of these two elements 1, so that this alternative form of the tractor also comprises an inverted U-structure, the width of which can be regulated.

What I claim is:

1. A tractor with an engine and a straddle frame comprising:
    two frame elements spaced apart from each other, extending obliquely and arranged parallel and symmetrically with respect to a vertical plane of longitudinal symmetry, and each equipped at their lower portion with a wheel and a driving wheel element;
    transverse bracing means, assembled by their extremities on the upper portions of said frame elements;
    driving means carried by said bracing means, above the level of said bracing means;
    invariable means for transmitting the power of the engine to each of said driving wheels, mounted on said bracing means and said driving-wheel elements;
    a system of steering wheels including two stanchions extending obliquely in a direction opposite to said frame elements and parallel to the vertical plane of symmetry of said frame elements;
    means for fixing each said frame element to one of said stanchions, said fixing means permitting a relative sliding movement of said driving-wheel element and said stanchion;

supports on said frame for mounting a driving station equipped with flexible cables connecting said station to said driving means and to said system of steering wheels.

2. A tractor as claimed in claim 1, in which:

each said stanchion is formed with front and rear transverse faces and with right-hand and left-hand flat lateral faces;

said fixing means comprising supporting elements applied against said transverse faces, and guiding elements applied against said lateral faces, said supporting and guiding elements being rigidly fixed to each said frame element corresponding to said stanchion.

3. A tractor as claimed in claim 2, in which:

the transverse faces of each said stanchion are cylindrical and coaxial with a geometric axis adjacent to the bottom portion of said driving-wheel elements;

said guiding elements on the lateral faces of a stanchion comprise two plates rigidly fixed to the upper portion of the corresponding driving-wheel element and applied on each side of the lateral faces of said stanchion;

said supporting elements are adjacent to said plates.

4. A tractor as claimed in claim 3, in which:

said supporting elements on the cylindrical faces of a stanchion comprise transverse rollers;

a transverse articulation is rigidly fixed to the bottom portion of said driving-wheel element;

a longitudinal member is rigidly fixed by one of its extremities to the bottom portion of the stanchion and is articulated in said axle.

5. A tractor as claimed in claim 2, in which:

each said stanchion is provided with a transverse opening extending longitudinally;

said guiding elements comprise two plates rigidly fixed to the upper portion of said driving-wheel element and arranged on each side of the lateral faces of said stanchion;

a rod mounted transversely between said guiding plates is engaged in the transverse opening of said stanchion so as to constitute a guiding element;

the foot of each said stanchion is articulated on said steering systems;

a transverse articulation axle is rigidly fixed on the lower part of said driving-wheel elements;

a longitudinal girder member is rigidly fixed at one of its extremities to the bottom portion of the steering system and is articulated in said axle.

6. A tractor as claimed in claim 2, in which said transverse bracing means comprise three rods parallel to each other and forming a triangular configuration.

7. A tractor as claimed in claim 6, in which:

two sockets are fixed transversely on the upper portion of each said driving-wheel elements;

two rods parallel to each other, rigidly fixed on a platform carrying said driving means and adapted to slide in said sockets are engaged in these latter;

a screw and nut mechanism adapted to be coupled to said driving means for the purpose of varying the distance between said sides is mounted on these latter and includes a rod with threaded ends, parallel to the rods sliding in said sockets and spaced apart from the plane formed by said sockets;

two nuts are rigidly fixed to said driving-wheel elements respectively, and are engaged on the threaded ends of said rod with threaded ends;

hydraulic means are provided to ensure the adjustment of the steering system elements, as a function of the distances between the sides of said frame;

the transmission means between the engine and said driving wheels comprise toothed wheels mounted on said driving-wheel elements and adapted to slide on transverse shafts associated with said driving means.

8. A tractor as claimed in claim 2, in which:

each said driving-wheel element comprises:

on the one hand two side-plates extending parallel to the vertical plane of symmetry of said driving-wheel elements, on the other hand, a plate welded transversely between the upper portions of said side-plates and forming a fork;

said guiding elements are constituted by the arms of said fork;

the supporting elements are mounted adjacent to said arms.

9. A tractor with an engine and a straddle frame comprising:

two frame elements spaced apart from each other, extending obliquely and arranged parallel and symmetrically with respect to a vertical plane of logitudinal symmetry, and each equipped at their lower portion with a driving wheel and a driving-wheel element;

transverse bracing means, assembled by their extremities on the upper portions of said frame elements;

driving means carried by said bracing means;

invariable means for transmitting the power of the engine to each of said driving wheels;

a system of steering wheels including two stanchions extending obliquely in a direction opposite to said from elements and parallel to said vertical plane of symmetry of said frame elements;

means for fixing each said frame element to one of said stanchions, said fixing means permitting a relative sliding movement of said frame elements and said stanchion;

10. A tractor as defined in claim 9 wherein each stanchion consists of a curved element extending in a plane parallel to the plane of symmetry of said driving-wheel elements and coaxially to a transverse axis adjacent the lower portions of said driving-wheel elements; and wherein said fixing means are integral with said driving-wheel elements and include supporting and guiding elements applied against the face of a related stanchion.

11. A tractor as defined in claim 10 wherein said transverse bracing means includes three parallel rods spaced from each other in a triangular configuration.

12. A tractor as defined in claim 11 wherein means for a transverse articulation, coaxial to the axis of curvature of said stanchion, is integrally mounted at the lower portion of each driving-wheel elements; and wherein a longitudinal girder member is fixed at one end thereof to the lower portion of the steering system corresponding to said driving-wheel element and is articulated in said transverse articulation means of said driving-wheel element.

13. A tractor as defined in claim 11 wherein two sockets are fixed transversely on the upper portion of each said driving-wheel elements; wherein two parallel rods fixedly mounted on a platform carrying said driving means and adapted to slide in said sockets, are received in said sockets; wherein a mechanism, including a pair of rods having threaded ends and four screws adapted to be coupled to said driving means for varying the distance between said frame elements, is mounted on said frame elements and includes a third rod with threaded ends and two screws, said third rod being parallel to said rods sliding in said sockets and being spaced from the plane formed by said sockets; wherein means are provided to ensure an adjustment of said steering system relatively to the distance between said frame elements; and wherein the invariable means between the engine and the driving wheels comprise toothed wheels mounted on said driving-wheel elements and adapted to slide on transverse shafts associated with said driving means.

14. A tractor with an engine and a straddle frame comprising: two frame elements spaced apart from each other, extending obliquely and arranged symmetrically with respect to a vertical plane of longitudinal symmetry, and each equipped at their lower portion with a wheel and a driving-wheel element; a system of steering wheels including two stanchions extending obliquely in a direction opposite to said frame elements and parallel to the vertical plane of symmetry of said frame elements; means for fixing each driving-wheel element to a corresponding stanchion and forming a side frame; three parallel rods spaced from each other in a triangular configuration, said rods being disposed transversely and having their extremities rigidly assembled at the upper portion of the side frames; driving means carried by said rods; and invariable means for transmitting the power of the engine to each of said driving wheels and said driving-wheel elements.

* * * * *